March 23, 1954
D. M. ALSTADT ET AL
2,673,170
RUBBER REINFORCED STRUCTURE
Filed March 12, 1951
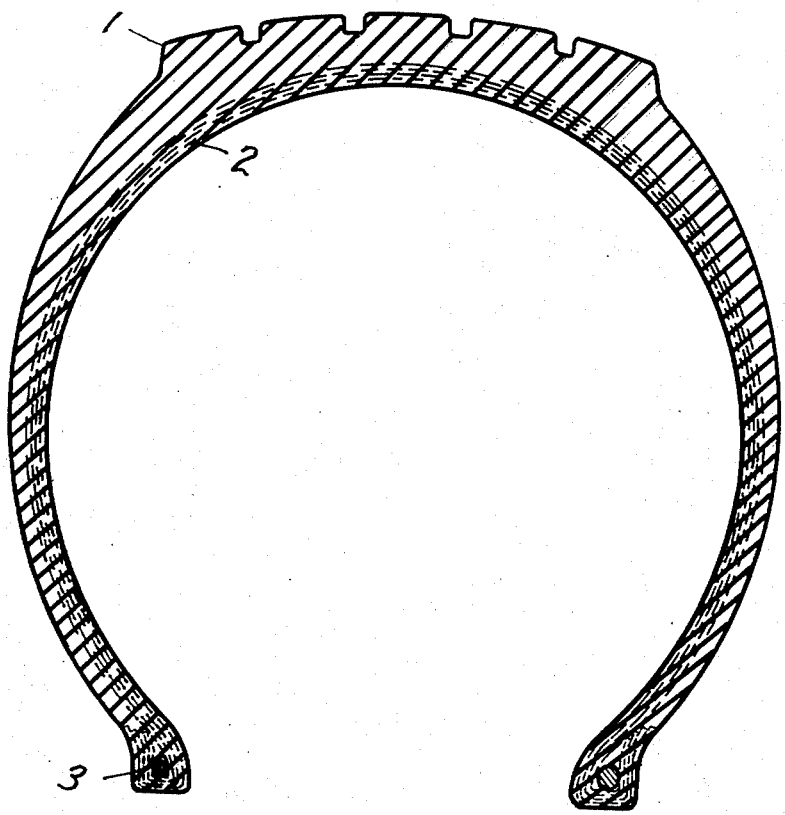
Inventors
Donald M Alstadt
Elmer W Coleman Jr
By
Ralph Hammar
Attorney Patented Mar. 23, 1954

2,673,170

UNITED STATES PATENT OFFICE 2,673,170

RUBBER REINFORCED STRUCTURE

Donald M. Alstadt and Elmer W. Coleman, Jr., Erie, Pa.

Application March 12, 1951, Serial No. 215,093

9 Claims. (Cl. 154—52)

In reinforced rubber structures such as pneumatic tire casings, many fibers or filaments have been suggested for the reenforcing fabric square woven, cord or weftless) and many expedients have been suggested for increasing the mechanical elasticity of the filaments and for increasing the adhesion of the filaments to the rubber, since none of the filaments heretofore proposed has the inherent property of bonding directly to the rubber.

This invention is intended to produce a natural or synthetic rubber article having a reenforcing structure of 2,3 dichlorobutadiene 1,3 polymers and copolymers vulcanized with the rubber. These materials have the ability to bond or unite with the rubber during vulcanization or curing producing a homogeneous structure. For example, in tires, the intimate adhesion of the reenforcing filaments to the rubber reduces the internal friction and increases the strength and service life. The adhesion is such that the rubber ruptures before the bond from the filaments to the rubber breaks. This adhesion is obtained with natural and synthetic rubbers.

Filaments, films, rods, and other structural forms of polymers and copolymers of 2,3 dichlorobutadiene 1,3 are known (see Patents 2,445,726 Willert and 2,514,195 Kuhn) and exhibit tensile strength in the range of 30,000–100,000 lbs./square inch depending upon the method of manufacture. The materials are also characterized by resilience, toughness, flexibility, and resistance to chemical and heat deterioration.

While the mechanism of bonding, and for that matter vulcanization, is the subject of diverse theories, the chemical bonding may be explained as due to secondary valence forces and/or primary chemical cross-linking between the rubber and the 2,3 dichlorobutadiene 1,3 in the polymer at the interfaces. The relative importance of secondary valence and primary valence forces will depend on the types of rubber involved.

In the drawing, the single figure is a section through a tire casing.

In the drawing, 1 indicates the tread, 2 the reenforcing fabric, and 3 the bead of pneumatic tire casings, a typical reenforced structure. In the manufacture, the casing is typically built up with alternate layers of fabric and rubber and the entire assembly vulcanized in a mold under heat and pressure. This is the common procedure.

The distinguishing feature of the tire casing lies not in the manner in which the fabric and rubber are assembled, but in the fact that the fabric is constructed of filaments of polymers and copolymers of 2,3 dichlorobutadiene 1,3. Such filaments fibers during vulcanization, bond to the rubber with such tenacity that the rubber will break before the bond from the fibers to rubber break. This is true under any kind of stress, whether tension, compression, shear, or tearing. Instead of a tire casing as presently available where the adhesion is materially less than the strength of the rubber, the fibers of the present invention are so firmly united with or to the rubber that the resultant tire structure functions as though made of a truly homogeneous material in that there is a minimum of internal friction between the fabric and the rubber.

The construction of the tire casing requires no substantial modification of the present manufacturing processes. The filaments can be woven into the tire fabric in the conventional manner. The rubber stock used in the fabrication of the process can, as at present, be selected to withstand the operating stresses and can be natural or synthetic rubber, as dictated by the design and operating requirements. The bonding of the fabric to the rubber takes place during the vulcanizing or curing process and does not require any modification of the time of vulcanization. In short, the textile and rubber machinery now used in making tire casings is adaptable to making the present casings, the sole difference being in the structure and treatment of the filaments used in the weaving of the tire fabric.

As in all fibre to rubber bonds, it is desirable that there be intimate contact between the fabric and the rubber to be bonded thereto in the nature of a physical wetting. This can be accomplished in the conventional manner by tackifying the fabric with a solvent or plasticizer coated on and/or compounded in either the fabric or the rubber or both. It is also possible to achieve the same results by coating or compounding either the fibre or the rubber (or both) with a compatible resin such as cumarone indene or terpene resins which in minor proportions have the property of bringing the fibre and rubber into intimate contact so as to permit the production of adhesion during the vulcanization. This latter procedure also reduces the tendency of the fibres to react with foreign agents during storage, etc., prior to the bonding operation. The fabric can also be conditioned by applying a fresh solution of the polymer or copolymer or the monomer 2,3 dichlorobutadiene 1,3 itself, These expedients of promoting intimate physical contact by solvents, plasticizers, or solutions of compatible materials, which have the property of wetting the rubber and fabric are well known in the adhesive art. These expedients do not change the fundamental adhesion or bond from the rubber to the filament of 2,3 dichlorobutadiene 1,3, but are used to make the bonding process physically easier to carry out by promoting the physical wetting of the surfaces to be joined so that the chemical reaction and/or secondary valence orientation which takes place during the vulcanization of the actual bond can be more easily carried out.

Since the bond to the fibres is believed to be chemical, it is essentially unaffected by the treatment of the fibres to increase the mechanical strength or other properties by preferential orientation of the crystal structure. Nor is the bond effected by spinning or twisting to modify the mechanical resilience of the fibres.

From the point of view of adhesion, it is unnecessary that the 2,3 dichlorobutadiene 1,3 monomer constitute a major proportion of the filament. Where the monomer constitutes as little as 25% by weight, the adhesion is still appreciable although it may not exceed the strength of the rubber. This suggests that still further dilution is possible where the extremely high bond strength is unnecessary. For bond strengths exceeding the tensile strength of the rubber, a dichlorobutadiene concentration of at least 50% is recommended.

What is claimed as new is:

1. A rubber structure comprising a body of rubber in contact with filaments comprising a material selected from the group consisting of polymers of 2,3 dichlorobutadiene 1,3 and copolymers comprising 2,3 dichlorobutadiene 1,3 said body and filaments being vulcanized together.

2. Rubber tires containing, as a reenforcing element therein, a reenforcing structure of filaments comprising a material selected from the group consisting of polymers of 2,3 dichlorobutadiene 1,3 and copolymers comprising 2,3 dichlorobutadiene 1,3, said filaments being vulcanized to the rubber.

3. Rubber tires containing, as a reenforcing element therein, a reenforcing structure of filaments comprising material selected from the group consisting of oriented crystalline polymers of 2,3 dichlorobutadiene 1,3 and oriented crystalline copolymers comprising 2,3 dichlorobutadiene 1,3, said filaments being vulcanized to the rubber.

4. Rubber tires containing, as a reenforcing element therein, a reenforcing structure of filaments comprising material selected from the group consisting of polymers of 2,3 dichlorobutadiene 1,3 and copolymers of 2,3 dichlorobutadiene 1,3 containing at least 25% of 2,3 dichlorobutadiene 1,3, said filaments being vulcanized to the rubber.

5. A plied cord rubber structure having vulcanized therein, cords comprising material selected from the group consisting of polymers of 2,3 dichlorobutadiene 1,3 and copolymers comprising 2,3 dichlorobutadiene 1,3, said cords being vulcanized to the rubber.

6. Vulcanized rubber articles reenforced with filamentous structures comprising material selected from the group consisting of polymers of 2,3 dichlorobutadiene 1,3 and copolymers comprising 2,3 dichlorobutadiene 1,3, said structures being tackified by a material selected from the group consisting of solvents and plasticizers and vulcanized with the rubber.

7. Vulcanized rubber articles reenforced with filamentous structures comprising material selected from the group consisting of polymers of 2,3 dichlorobutadiene 1,3 and copolymers comprising 2,3 dichlorobutadiene 1,3 and a minor amount of a resin compatible with the rubber and structures interspersed between contacting surfaces of the structure and rubber, said structures and rubber being vulcanized together.

8. Articles as claimed in claim 7 in which the resin is selected from the group consisting of coumarone, indene and terpene resins.

9. Vulcanized rubber articles reenforced with filamentous structures comprising material selected from the group consisting of polymers of 2,3 dichlorobutadiene 1,3 and copolymers comprising 2,3 dichlorobutadiene 1,3 said structures being surface activated by an agent selected from the group consisting of 2,3 dichlorobutadiene 1,3 monomer, solutions of polymers of 2,3 dichlorobutadiene 1,3 and solutions of copolymers comprising 2,3 dichlorobutadiene 1,3 and said structures being vulcanized with the rubber.

DONALD M. ALSTADT.
ELMER W. COLEMAN, JR.

References Cited in the file of this patent

UNITED STATES PATENTS

| Number | Name | Date |
|---|---|---|
| 1,366,220 | Swinehart | Jan. 18, 1921 |
| 1,862,492 | Mallory | June 7, 1932 |
| 2,231,359 | Day | Feb. 11, 1941 |
| 2,273,200 | Hoff | Feb. 17, 1942 |
| 2,445,726 | Willert | July 20, 1948 |
| 2,494,649 | Dreyfus | Jan. 17, 1950 |
| 2,514,195 | Kuhn | July 4, 1950 |
| 2,541,550 | Sarbach | Feb. 13, 1951 |